United States Patent
Thielman et al.

(10) Patent No.: US 8,203,590 B2
(45) Date of Patent: Jun. 19, 2012

(54) VIDEO CAMERA CALIBRATION SYSTEM AND METHOD

(75) Inventors: Jeffrey Thielman, Corvallis, OR (US); Jeffrey Lane, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1323 days.

(21) Appl. No.: 11/899,058

(22) Filed: Sep. 4, 2007

(65) Prior Publication Data

US 2009/0058987 A1    Mar. 5, 2009

(51) Int. Cl.
*H04N 7/14* (2006.01)
(52) U.S. Cl. .................. 348/14.05; 348/14.08; 348/14.1
(58) Field of Classification Search .... 348/14.01–14.16, 348/576
See application file for complete search history.

(56) References Cited

U.S. PATENT DOCUMENTS

| 7,864,210 | B2 * | 1/2011 | Kennedy ................. 348/14.08 |
| 7,924,305 | B2 * | 4/2011 | Thielman et al. .......... 348/14.09 |
| 2002/0094189 | A1 | 7/2002 | Navab et al. |
| 2003/0210329 | A1 | 11/2003 | Aagaard et al. |
| 2004/0263611 | A1 | 12/2004 | Cutler |
| 2005/0036036 | A1 | 2/2005 | Stevenson et al. |
| 2005/0099501 | A1 | 5/2005 | Kang |
| 2005/0140779 | A1 | 6/2005 | Schulz et al. |
| 2006/0203090 | A1 | 9/2006 | Wang et al. |
| 2006/0209186 | A1 | 9/2006 | Iyoda et al. |
| 2007/0115358 | A1 | 5/2007 | McCormack |

\* cited by examiner

Primary Examiner — Suhan Ni

(57) ABSTRACT

A video camera calibration system includes a video camera, having a fixed location and a variable viewing orientation with respect to a fixed object, and a video calibration target, integral with the fixed object and having a known position. The viewing orientation of the video camera can be adjusted by aligning the position of the video calibration target in a video image produced by the video camera.

20 Claims, 6 Drawing Sheets

VIDEO CAMERA CALIBRATION SYSTEM AND METHOD

BACKGROUND

The present disclosure relates generally to the calibration of video camera views. More specifically, the present disclosure relates to targets used for remote alignment of cameras, such as in a video conference room.

Video conference systems that use specially-configured video conference studios have been developed to provide the look and feel of a face-to-face conference. Such systems can include a pair (or more) of specially-configured video conference studios that each include seating places for multiple persons facing one or more video conference displays. One or more video conference cameras take images of the persons in each room, and provide the respective images to corresponding video displays in the other video conference studios, wherever they are located. In this type of video conference arrangement, the participants can see and hear the other participants as if they were all together in the same room. These types of video conference systems are sometimes referred to as "remote presence" or "telepresence" video conference systems. With the video conference cameras properly oriented and a suitable background in each conference room, this configuration can provide a blended video conference environment that approximates the appearance of a face-to-face conference session.

One potentially time-consuming and expensive process that can be associated with remote presence video conference systems is the alignment and calibration of the video cameras. The video cameras in specially-configured video conference studios can each include a pan-tilt-roll (PTR) mechanism, which allows the orientation and alignment of each camera to be adjusted. Mechanical adjustment of the camera alignment, along with adjustment of the zoom and focus controls of the camera itself, allows the camera to provide different views. For example, in some instances it can be desirable for a given camera to view three or more participant positions in the conference room, while at other times it may be desired for the same camera to be adjusted to view only one or two participant positions. This process typically requires someone in the room to help set up alignment targets or marks in specific locations of the room so that a remote person can perform the calibration. After the alignment is finished, the marks are removed. Once a room is in a production state, if there is a problem with the view of any given camera, a person must go back to the room to replace the targets to help realign the cameras.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Figure 1:
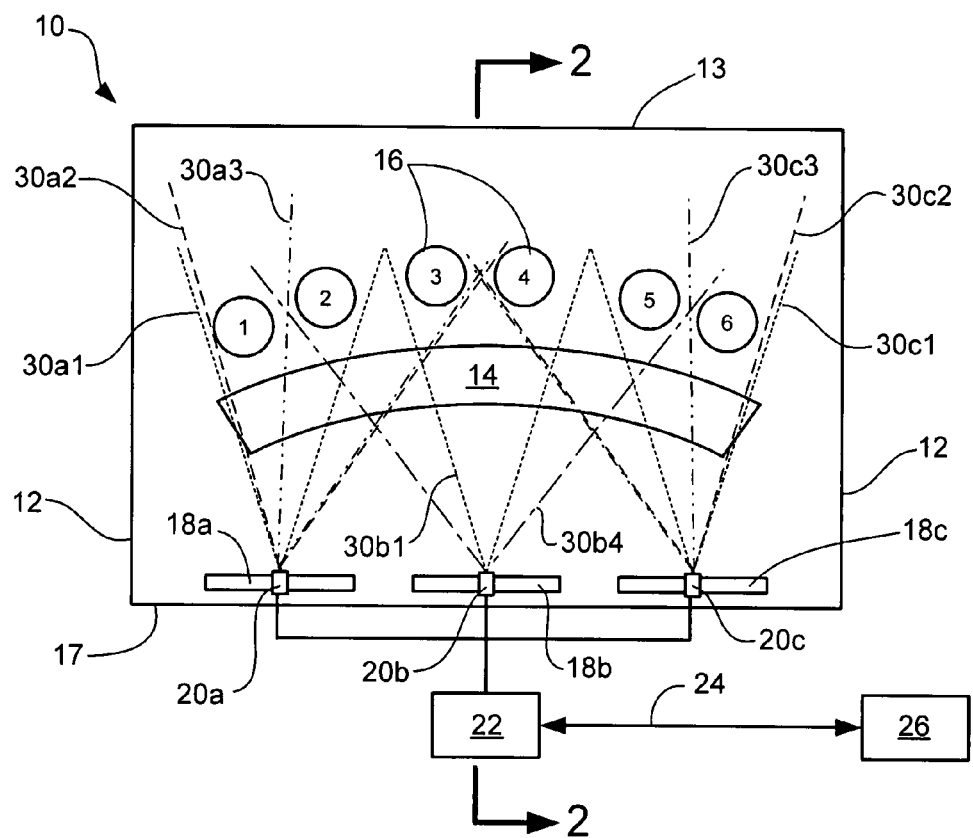
FIG. 1 is a plan view of one embodiment of a video conference room incorporating embedded calibration targets.

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

Figure 2:
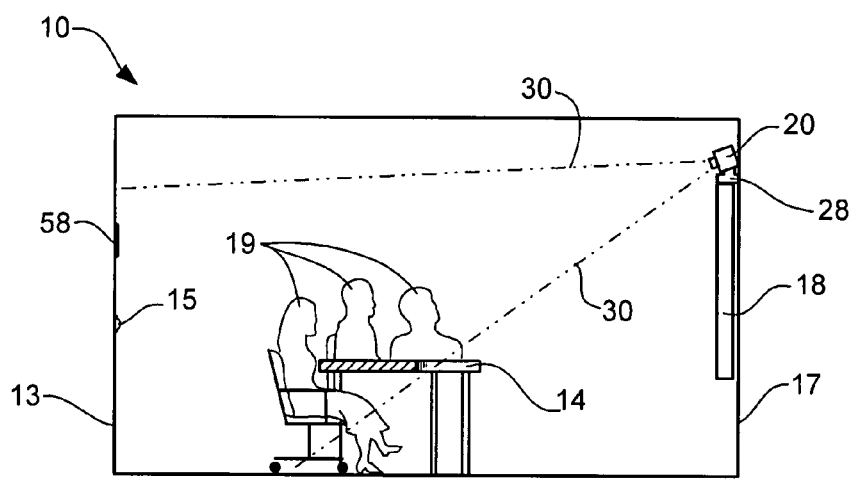
FIG. 2 is a cross-sectional or elevation view of the video conference room of FIG. 1.

As noted above, one potentially time-consuming and expensive process that can be associated with remote presence video conference systems is the alignment and calibration of the video cameras. A plan view of one embodiment of a specially-configured video conference studio 10 is provided in FIG. 1, and an elevation/cross-sectional view of the same is shown in FIG. 2. In this embodiment, the video conference studio is a room bounded by walls 12, including a back wall 13, and having a conference table 14 with a plurality of participant positions 16 (e.g. chairs, numbered 1-6 in FIG. 1) adjacent to the table, at which video conference participants 19 can sit. On a front wall 17 of the room, opposite the conference table, are a plurality of video conference displays 18 (e.g. flat panel or other video displays), with a video camera 20 positioned above each display. In the embodiment of FIG. 1 the displays and cameras are labeled a, b, and c, respectively. While three cameras and three displays are depicted in FIG. 1, it is to be understood that video conference systems generally and remote presence video conference systems in particular are not limited to this number. Such studios can have more or less than three cameras and three displays. While the cameras are depicted in the figures as being directly above the respective monitors or displays, they can be in other locations around the studio, such as all above one display, located above a different part of the display, or located separate from the display, etc.

The cameras 20 and displays 18 are interconnected to a control system 22, such as a computer network, which in turn is interconnected via a communications network (e.g. the Internet), represented by line 24, to one or more remote information systems 26. For a video conference, the remote information system will be a similar video conference control system (not shown) associated with a remote video conference studio (not shown). Video images taken from each room are transmitted and displayed upon the corresponding displays of the opposite room. Alternatively, the remote information system can be a remote control system that allows a remote user to control or adjust the video conference cameras 20 and displays 18 of the video conference room 10.

Viewing FIG. 2, the video cameras 20 can each include a pan-tilt-roll (PTR) mechanism 28, which allows the orientation and alignment of each camera to be adjusted. Each camera has a field of view 30 that depends on the orientation of the camera (pan, tilt and roll) and the zoom and focus setting of the camera itself. This field of view has a vertical scope or range, as shown in FIG. 2, and a horizontal scope or range, which is depicted in FIG. 1.

Adjustment of the camera alignment, along with adjustment of the zoom and focus controls of the camera, allows each camera to provide different views, which can be desirable in different circumstances. A variety of camera fields of view are illustrated in FIG. 1, and the display images they provide are illustrated in FIGS. 3A-3D. It is to be appreciated, however, that the views and images shown herein are exemplary only, and a wide variety of other fields of view and corresponding images can be provided. Likewise, certain camera orientations and corresponding views may be more desirable or common than others, both among those shown herein and others not shown.

Figure 3A:
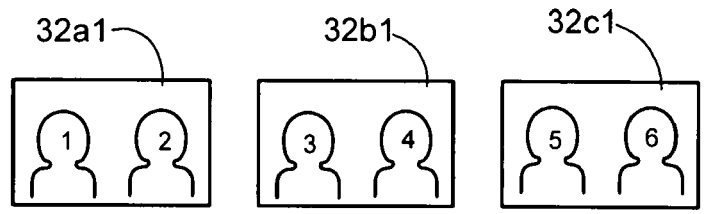
FIG. 3A depicts one embodiment of the video conference views that can be provided by the video conference room of FIG. 1.

Viewing FIG. 1, in a six position video conference studio, a common camera orientation can have each of three cameras 20 oriented substantially straight ahead, taking an image of the two participant positions that are directly opposite the associated display 18. The respective camera view ranges are designated by dashed lines labeled 30a1 to 30c1. The display images that this camera orientation provides are illustrated in FIG. 3A. Camera 20a provides image 32a1, which shows the persons at positions 1 and 2. Camera 20b provides image 32a2, which shows the persons at positions 3 and 4 in the conference room 10. Similarly, camera 20c provides image 30c1, which shows the participants at positions 5 and 6 in the conference room. With two video conference rooms linked this way in a reciprocal fashion, this arrangement of views helps provide the remote presence video conference experience for the participants in each room.

Figure 3B:
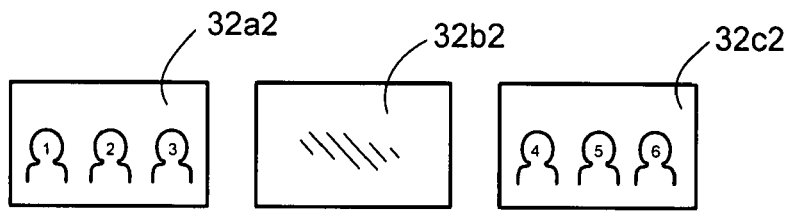
FIG. 3B depicts another embodiment of the video conference views that can be provided by the video conference room of FIG. 1.

In other instances it can be desirable for a given camera to view more participant positions in the conference room. For example, in a two-point video conference (i.e. a conference between exactly two video conference studios) it can be desired to insert a video conference view from a third location using one of the displays in each conference room. Alternatively, it can be desired to use one display in each conference room as a reference display, to show graphics, data, etc. for reference by the video conference participants. Referring to FIG. 1, where there are six participants in each room, the two outside cameras 20a and 20c can each be adjusted to view three participant positions. Thus, camera 20a is adjusted to have a field of view 30a2, and camera 20c is adjusted to have field of view 30c2. The center camera 20b is inactive in this arrangement. As shown in FIG. 3B, with the cameras adjusted to these fields of view, the corresponding displays in the opposite conference room can show participants 1, 2 and 3 on the left in view 32a2 (though at a smaller size) and participants 4, 5 and 6 on the right in view 32c2 (also at a smaller size). The center display, designated as view 32b2, can then be provided with reference data or a video feed from another video conference location, or used in other ways.

Figure 3C:
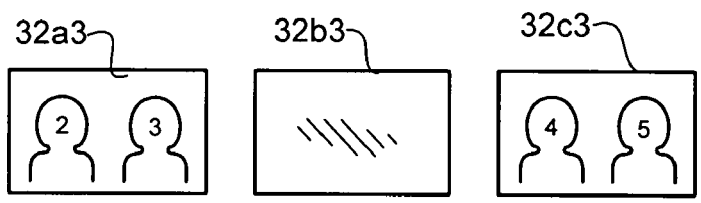
FIG. 3C depicts another embodiment of the video conference views that can be provided by the video conference room of FIG. 1.

If it is desired to have the participant images at a larger size, video cameras 20a and 20c can be adjusted to view participant positions 2, 3 and 4, 5, respectively, as indicated by fields of view 30a3 and 30c3, as shown in FIG. 1. The display images provided by this view adjustment are shown in FIG. 3C. Camera 20a will provide image 32a3, which shows participants 2 and 3, while camera 20c will provide image 32c3, which shows participants 4 and 5. Camera 20b is again inactive in this configuration, and display 32b3 can be used for video from a third video conference location or as a reference display, etc.

Figure 3D:
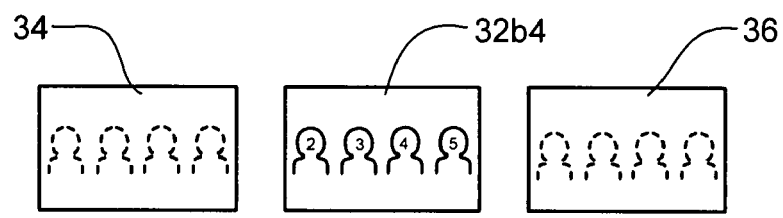
FIG. 3D depicts another embodiment of the video conference views that can be provided by the video conference room of FIG. 1.

There are other circumstances in which it can be desirable to adjust the fields of view of the various video conference cameras. For example, in a four-way video conference (i.e. four video conference rooms interconnected in a roundtable fashion) the field of view of each camera can be adjusted to view the same group of participants in a given room, though from a different vantage point. Each view is provided to only one of the other three video conference studios, so that each studio has right, left and center views that give the appearance of straight-on and side angle views of the participants in the other conference rooms, corresponding to their display positions. This type of approach is depicted in FIGS. 1 and 3D, where the center camera 20b is adjusted to have field of view 30b4, encompassing participants 2-5. In an opposing conference room the center display can have image 32b4. The other displays 34 and 36 can show images of the participants in the other two opposing conference rooms. These other two images can be from different vantage points, similar to what would be obtained if camera 20a or 20c were adjusted to view participants 2-5, respectively, though from the other conference rooms.

Whatever alternate field of view is desired, the process of adjusting the camera views can be time consuming and expensive, or inaccurate. One approach that has been tried is to adjust the camera system until it looks "good" in the opinion of an operator. This has been a common method, but does not provide consistent results. Another common method has been to give control of the camera orientation to the users in the room, allowing them to adjust each camera independently. This approach can be complicated, and it can be difficult to achieve a consistent image.

Other approaches to video camera calibration require a person to be present in each conference room to help set up alignment targets or marks (e.g. of paper or similar material) in specific locations of the room (e.g. at positions where participants are to sit), so that a remote person can perform the calibration of the cameras to provide the desired views. The size and appearance of the targets can vary, but they must be positioned accurately to allow accurate calibration. After the alignment is finished, the marks are typically removed. Once a room is in a production state, if there is a problem with the view of any given camera, a person must go back to the room to replace the targets to help realign the cameras.

Advantageously, the inventors have developed a system and method for remote calibration of video conference views that is believed to be less expensive and time-consuming, and allows a person to align the cameras in a video conference room by an entirely remote process. In this system visual targets for remote calibration and alignment of cameras are embedded in fixed furniture, walls, fixtures, etc. in the video conference environment. The targets show specific fixed locations to the cameras, which can be aligned (either automatically or manually) to coincide with certain regions on a screen for a particular desired view. This system allows a person to align the cameras by an entirely remote process, and to adjust the pan, tilt, roll, zoom and focus of the camera to obtain the desired image view. One advantage of this system is that it can be used entirely remotely. No one must be in the room to setup or assist with the camera alignment, and no specialized equipment is required for the calibration.

Figure 4:
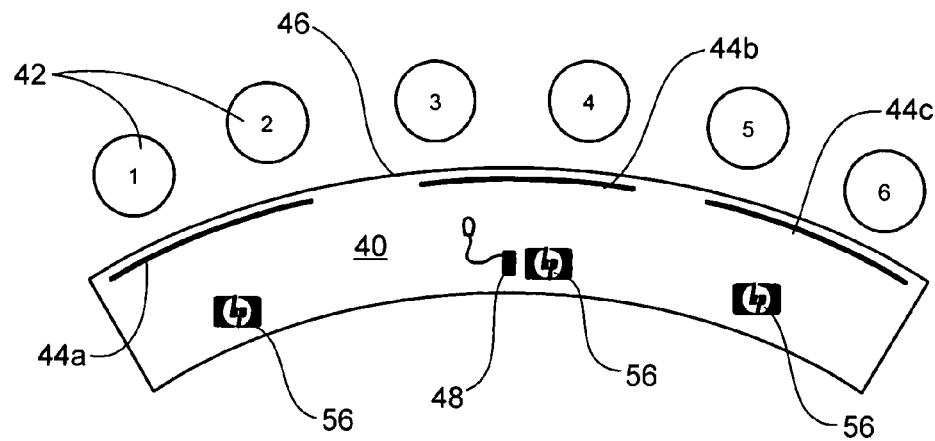
FIG. 4 is a plan view of one embodiment a conference table and participant positions that can be used in the video conference room of FIG. 1, the conference table having embedded calibration targets.
Figure 5:
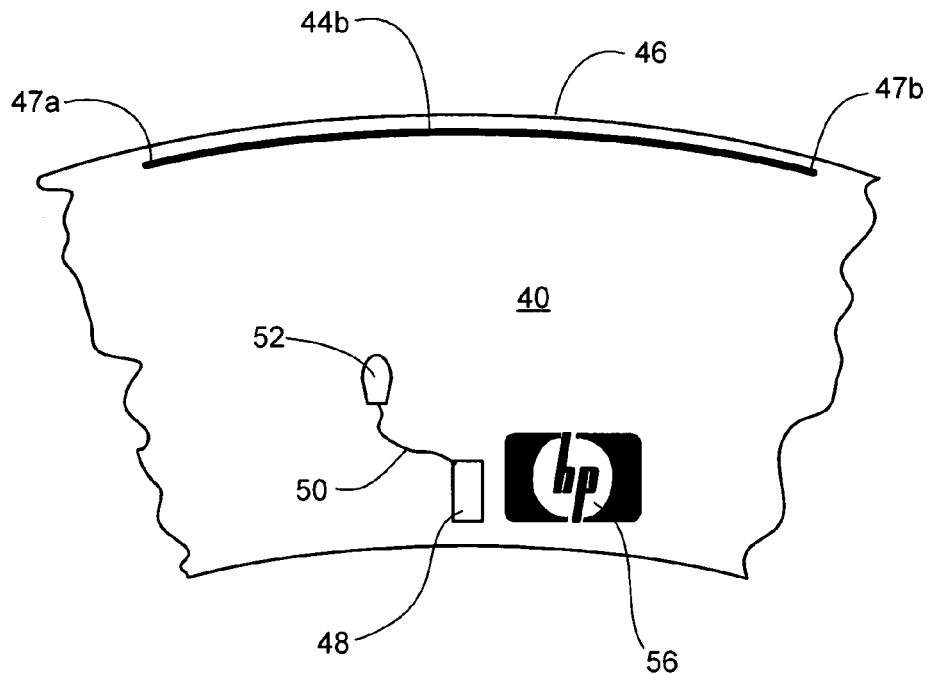
FIG. 5 is a close-up plan view of a portion of the video conference table of FIG. 4.

One embodiment of a fixed object having embedded video camera calibration targets is shown in FIGS. 4 and 5. Shown in FIG. 4 is a plan view of a curved conference table 40 (like the conference table 14 in FIG. 1) having a plurality of participant positions 42 (e.g. chairs) arranged on one side, and labeled 1-6. This conference table is designed to be affixed to a specific location in the video conference room (i.e. attached to the floor) and includes various types of embedded calibration targets. One type of embedded video calibration target is an elongate trim strip 44 located near the rear edge 46 of the table. As shown in FIG. 4, the conference table can include three trim strips 44a, 44b and 44c, one near each adjacent pair of chairs. The trim strip can be provided in various ways. For example, where the table top is of wood, wood veneer, or material of similar appearance, the trim strip can be a coplanar strip of wood veneer of a contrasting color. A wide variety of other materials and configurations can also be used. As discussed in more detail below, the trim strip provides a locationally fixed, visible feature whose size, position and orientation in a video image uniquely indicate the pan, tilt, roll and zoom settings of a camera that views the feature. Additionally, the trim strip is located close to the participant locations 42, which causes the participant locations to be substantially in focus when the trim strip is in focus.

There are a number of characteristics that are desirable for suitable calibration targets. One desirable characteristic of the embedded calibration targets is that they show up clearly on camera. The inventors have found that one way to achieve this is to design the target to have at least a minimum contrast with its surroundings. The level of contrast can be measured in IRE units (Institute of Radio Engineers, the group that set the measurement standard). As those of skill in the art will be aware, IRE is a camera measure of light intensity. Video images can be measured using a waveform monitor that is graduated in IRE units. The useful picture content of a video signal is measured as a percentage, where 0% (0 IRE) represents black and 100% (100 IRE) represents white. Using this scale, the relative brightness (i.e. contrast) of different portions of a video image can be expressed in terms of the difference between the IRE values of the respective image portions. In one embodiment, the inventors have found that a contrast of at least about 10 IRE units between the elements of the target and its immediate surroundings is sufficient contrast to allow a user or a pattern recognition algorithm to distinguish the target.

Another desirable characteristic of the calibration targets is that they be no smaller than some minimum size in a short dimension in the video image at any orientation or condition of the video camera (i.e. a worst-case setting with the camera zoomed out as far as possible and at a worst possible angle relative to the target). Given the worst case camera settings for a particular video conference room, the minimum dimension of the target feature can translate to an actual size in a room depending on distance, orientation, and camera focal length. In one embodiment, the minimum image size for a target feature is about 2 pixels. In one embodiment of a video conference room with cameras having a given range of pan, tilt, roll, zoom and focus settings, a minimum 2 pixel dimension for a line of trim 44c on a horizontal surface of a table 40 like that shown in FIGS. 4 and 5 corresponds to an actual minimum dimension (width) of about 6 mm.

It is also desirable that the embedded calibration targets mark important features of the room that need to always appear in the same location on screen for a given view. For example, if it is desired for the table to align between two screens, the edge of the table can be a calibration target. Likewise if there is a seam along the back wall of the video conference studio, and it is desired to ensure that this seam always aligns, the seam can become a calibration target. In one embodiment the table and back wall of the video conference room are fixed features, and thus have specified locations with respect to the cameras. Other features around the room can also be made into calibration targets as well.

It is also desirable that there be sufficient marks for all the degrees of freedom which must be set. In the video conference examples given herein, pan, tilt, roll and zoom are to be set. Advantageously, adjusting for all of these degrees of freedom can be done with just two calibration target features or points per camera, or one relatively long feature with two ends. A long feature can take up the majority of the screen width, for example, with a mark taking nearly all the screen being very useful. Referring to the trim strip 44c shown in FIG. 4, this calibration target feature is elongate and has readily discernable endpoints 48a, b. This configuration allows the size, position and orientation of the feature in a video image to be determined based solely upon the position of the endpoints.

Figure 6A:
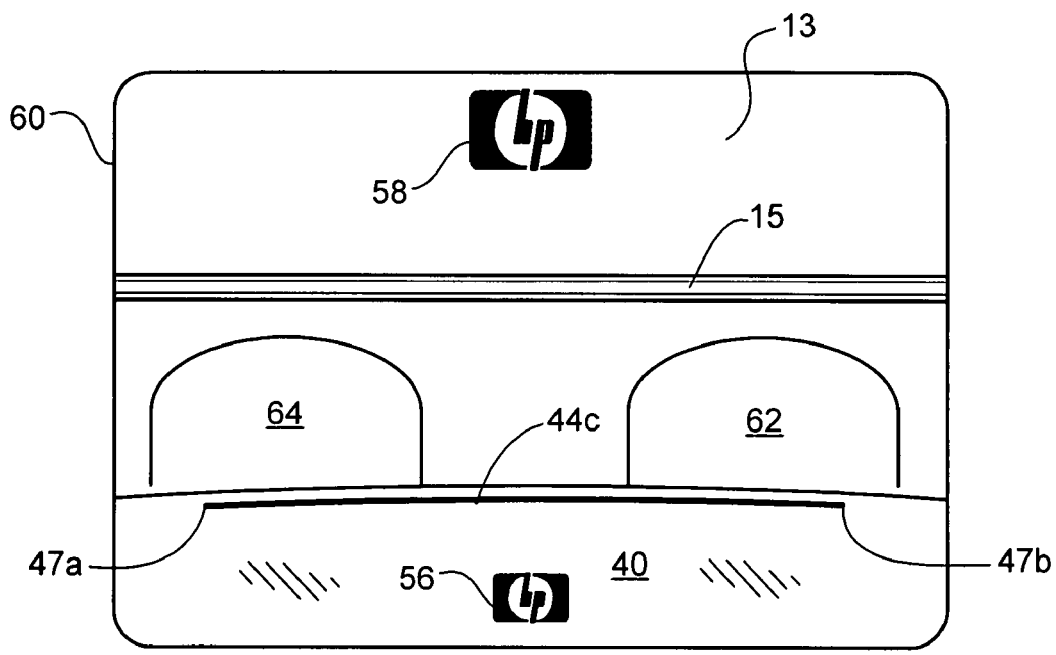
FIG. 6A depicts a video conference camera view encompassing two participant positions and related calibration targets in the video conference room of FIG. 1.

Various views of the conference table 40 and the calibration targets associated with it are shown in FIGS. 6A-7B. Shown in FIG. 6A is a video display image 60 of the table 40 from a camera adjusted to view two participant positions (chairs 62, 64) and nearby calibration targets in a video conference room like that of FIG. 1. This image corresponds to the camera field of view 30c1 taken by camera 20c in FIG. 1, in which participant positions 5 and 6 are visible. In this view the trim strip calibration target 44c and its endpoints 47a, b are clearly visible.

Figure 6B:
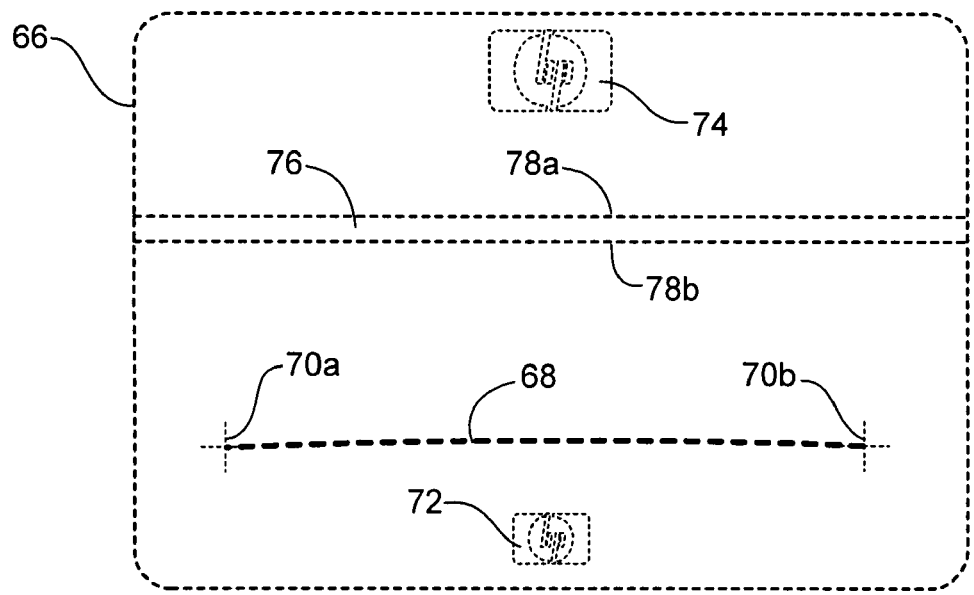
FIG. 6B depicts a template indicating positions of the calibration targets for the video conference camera view of FIG. 6A.

The endpoints 47a, b of the elongate target 44c can be used to indicate where the image must appear on camera for a desired view, thus allowing the setting of the pan, tilt, roll, and zoom of the camera. This can be done in a variety of ways. In one approach, a camera can be manually adjusted to a desired position, and the position of the target in the view from that position can be used to create a calibration target template. An example of a target template 66 is shown in FIG. 6B. The template includes an outline or shadow 68 of the target 44c and endpoint marks 70a, b. To adjust the camera view to the desired position, this template can be superimposed upon the video image taken from the camera, and the camera orientation can then be adjusted until the target in the image is the same size and in the same position and orientation as the shadow or outline of the target in the template. Specifically, the camera orientation is adjusted until the endpoint marks 70a, b coincide with the endpoints 47a, b of the target.

Figure 7A:
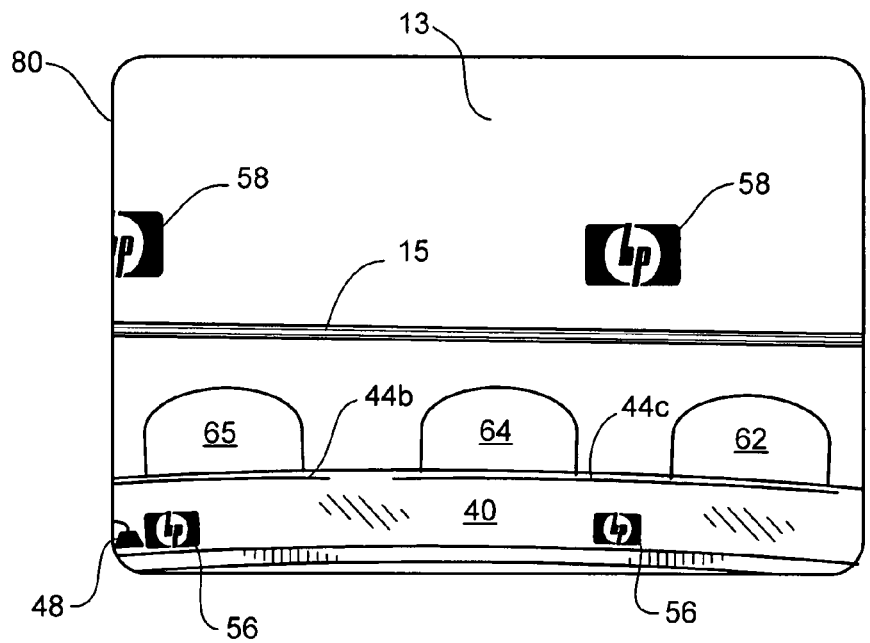
FIG. 7A depicts a video conference camera view encompassing three participant positions and related calibration targets in the video conference room of FIG. 1.
Figure 7B:
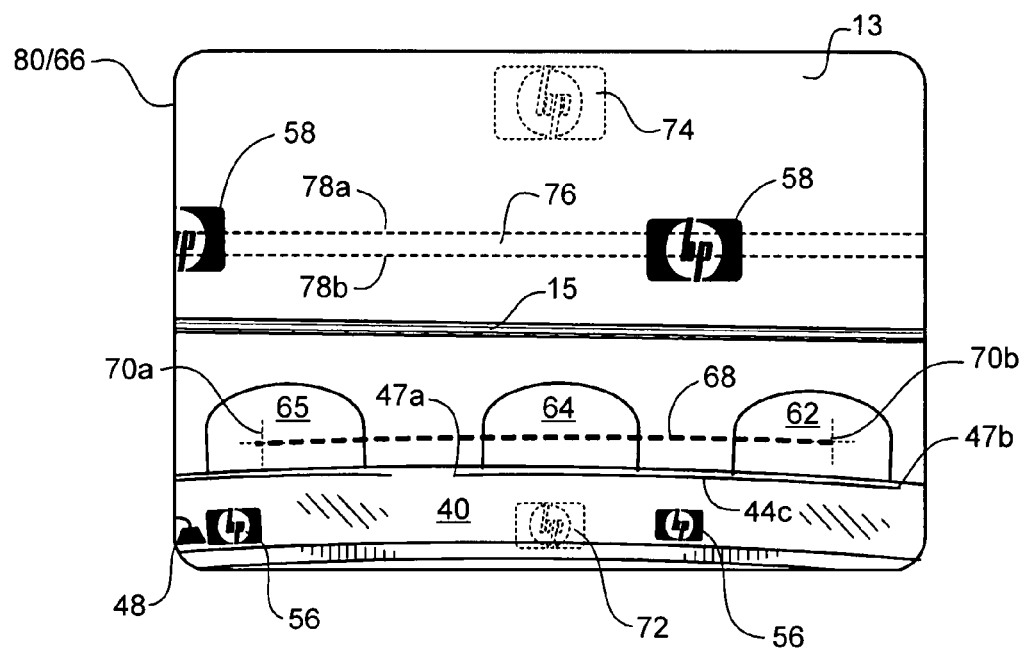
FIG. 7B depicts the template of FIG. 6B overlaid atop the video conference camera view of FIG. 7A.

An example of this process is illustrated by viewing FIGS. 7A, 7B and 6A. Shown in FIG. 7A is a video conference camera image 80 encompassing three participant positions (chairs 62, 64, 65) adjacent to the conference table 40. This view corresponds to the camera field of view 30c2, in which participant positions 4, 5 and 6 are visible. In this view all of target 44c is visible, along with a portion of target 44b. For this example, it will be assumed that the image of FIG. 6A is desired. The first step in calibrating the camera position to produce this desired image is to apply the proper image template. Shown in FIG. 7B is the template 66 of FIG. 6B overlaid atop the video conference camera image 80 of FIG. 7A. In FIG. 7B it can be seen that the shadow or outline 68 of the target and the endpoint marks 70a, b do not coincide with the size or position of the target 44c or endpoints 47a, b in the image.

To align these features, one or all of the pan, tilt, roll, and zoom of the camera can be adjusted. In one embodiment, adjustment of the camera orientation parameters can be performed manually. This can be done by a person viewing a display providing the image from the camera, and directly adjusting the pan, tilt, roll and zoom of the camera using a control system (either at a location in or near the conference room, or remote from the conference room) until the template matches with the desired target. When this is achieved, the image from the camera will appear as shown in FIG. 6A.

Alternatively, adjustment of the camera parameters to make the image match the template can be performed automatically, using pattern recognition software. Those of skill in the art will be aware that pattern recognition software that can recognize features in a video image is commercially available. For example, suitable pattern recognition vision software is commercially available from Matrox Electronic Systems, Ltd. of Dorval, Quebec, Canada, and from Cognex Corporation of Natick, Mass. A pattern recognition algorithm can be applied to the image of FIG. 7A. The system can be programmed to first recognize a given target, such as the target 44c, and, using suitable feedback routines, incrementally adjust the pan, tilt, roll and zoom of the camera until the position of the endpoints 47a, b of the target coincide with the endpoint marks 70a, b in the template, and the size, shape and position of the image of the target corresponds to the shadow or outline 68 in the template. Once again, when this is achieved, the image from the camera will appear as shown in FIG. 6A. It is to be appreciated that while a transition from a three person view (FIG. 7A) to a two person view (FIG. 6A) has been shown and described, many other transitions can be accomplished using the same type of method described above.

It is to be appreciated that suitable calibration targets can have a wide variety of forms and appearances, in addition to the trim strip 44. While the targets are shown as being embedded into the conference table, they can be attached to many other fixed surfaces, such as a wall, the floor, the ceiling, other types of tables or fixed chairs, or other objects. This can also include objects as parts of the marking system, such as a corner of a lamp, or a corner or edge of a table. Almost any type of fixed feature of suitable size and contrast in the video conference room can potentially be used to provide a calibration target.

At least two other types of potential calibration targets are shown in FIGS. 4 and 5. As one example, the conference table 40 can include a cable management insert or access hatch 48 through which cables and the like can extend from below the table to its top surface. In this case, a cable 50 for a computer mouse 52 is shown (though it will be apparent that this is only one of many possible examples). The cable management insert is of a fixed size and shape, and in a fixed position on the table top. As with the trim strip 44, the cable insert provides a locationally fixed, visible feature whose size, position and orientation in a video image can indicate the pan, tilt, roll and zoom settings of a camera that views the feature. Plan views of the cable insert are shown in FIGS. 4 and 5, and a camera view of the cable insert is shown in FIGS. 7A and B. Other portions of a conference table or other furniture, such as a portion of a table leg or a portion of a fixed chair, and other types of fixtures, such as a fixed bracket, etc. can also be used as camera calibration targets.

A logo or other graphical image, having suitable characteristics and being fixedly located within a camera's field of view, can also be used as a calibration target. Several such targets are shown in FIGS. 4-7. In particular, a corporate logo 56 can be attached to or embedded within the surface of the conference table 40 of FIGS. 4 and 5 in multiple locations if desired. Additionally, this logo (or other visible feature) can be positioned on a wall, ceiling, or other part of the video conference environment that can potentially be viewed by one of the cameras. For example, referring to FIG. 2, a larger corporate logo 58 can be positioned on the back wall 13 of the video conference room 10. As seen in FIGS. 6A and 7A, the small logos and larger logos can appear on camera in various locations, depending upon the orientation of the camera. Likewise, the size, location and orientation of the logos for a given camera view can be incorporated into a template. For example, the template 66 shown in FIG. 6B includes a small logo shadow or outline 72, showing a position of the small logo on the conference table surface for that specific view, and a larger logo shadow or outline 74 showing the position of the larger logo on the back wall for that specific view. As with the trim strip 44c, the relative position and size of the shadows can be used to align an actual image with the template to produce the desired image. Indeed, multiple target locations can be compared simultaneously, either by a user or by a pattern recognition algorithm, during the process of realignment of the camera positions.

Additional decorative or functional features or elements of a video conference room can also be used as video calibration targets. For example, as shown in FIG. 2, a conference room can include decorative trim 15 (e.g. a chair rail molding) attached to the back wall 13 or other part of the room, and within the field of view 30 of a camera 20. This trim, having a fixed location and fixed size and shape, can be used as a calibration target. FIG. 6A shows the wall trim target 15 in one particular conference view. FIG. 7A shows that same trim piece in a different view from the same camera.

Where the image of FIG. 6A is desired, the position and size of the trim target 15 can be represented by a shadow or outline 76 in the template 66 of FIG. 6B. While there are no visible endpoints of the trim target, the relative spacing of the top and bottom parallel edges 78a, b of the trim piece, representing its thickness, are visible and can be plotted. When the template of FIG. 6B, having the shadow of the trim target, is overlaid atop an image that differs from that of FIG. 6A, like that of FIG. 7A, a difference in the position and relative size of that target are readily visible, as can be appreciated by viewing FIG. 7B. A user of the system or an automatic pattern recognition system can then adjust the camera parameters until the image corresponds to the template, in the manner discussed above.

Figure 8:
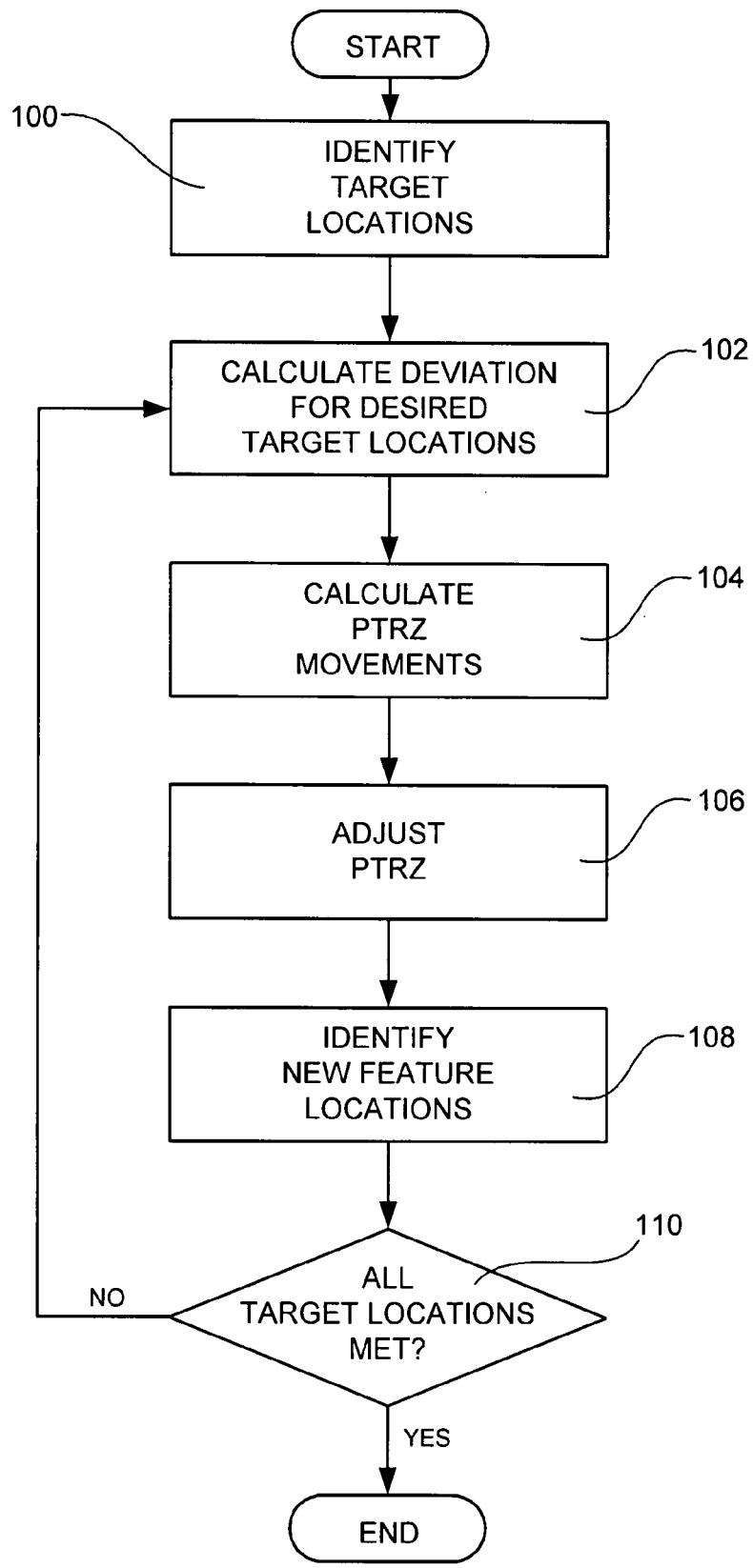
FIG. 8 is a flowchart outlining the steps involved in one method of automatic camera calibration in accordance with the present disclosure.

As noted herein, repositioning the cameras in a specialized video conference studio can be performed by a person, or it can be done automatically using pattern recognition software. The steps in one embodiment of an automatic method for calibrating camera views in a specialized video conference studio are shown in FIG. 8. At the outset, one or more target feature locations must be identified (step 100). This requires the pattern recognition algorithm to recognize the specific features in the video image that are calibration targets. Once these features are recognized, the system then calculates the camera deviation that is required to place these targets in a desired location (step 102). This step is functionally equivalent to the overlaying of a target location template, discussed above. Once the actual and desired target locations are known, the system then calculates the pan, tilt, roll and zoom (PTRZ) movements that are needed to bring the actual target locations into alignment with the desired or template locations (step 104). The system then adjusts the pan, tilt roll and zoom accordingly (step 106).

After the camera position has been adjusted, the pattern recognition algorithms are again applied to the resulting video image to identify the new locations of the target features (108), and the system analyzes the target locations with respect to the desired or template locations to determine whether the targets are all in the desired location (step 110). In other words, the system graphically analyzes the new target locations and compares them with the desired locations to determine whether the new locations coincide with the desired location, within some selected level of tolerance for positional deviation (e.g. within 2 pixels in each direction). These steps are performed as a check, to verify that the system has accurately repositioned the camera. If the target locations have not been met, the system returns to step 102 to repeat the realignment process. This feedback loop allows the system to repeat steps 102-110 as many times as needed until all calibration targets have moved to the desired location in the video image. It will be apparent to those of skill in the art that the automatic repositioning system can be programmed to eventually return an error message if the repositioning process is repeated many times without producing a satisfactory message at step 110. Once the targets are all properly located, however, the process concludes.

The system and method disclosed herein thus allows remote calibration of video conference views using visual targets that are embedded in fixed furniture, walls, fixtures, etc. in a video conference environment. The targets show specific fixed locations to the cameras, which can be aligned (either automatically or manually) to coincide with certain regions on a screen for a particular desired view. This system allows a person to align the cameras by an entirely remote process, and to adjust the pan, tilt, roll, zoom and focus of the camera to obtain the desired image view. One advantage of this system is that it can be used entirely remotely. No one must be in the room to setup or assist with the camera alignment, and no specialized equipment is required for the calibration. This is helpful during initial installation of a video conference environment, and even more so during recalibrations. An additional advantage of this system and method is that it provides readily recognizable features within the room so that an automatic calibration system can do all of the alignment work.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. A video camera calibration system, comprising:
   a video conference control system for receiving a video image from a video camera having a fixed location and a variable viewing orientation with respect to a fixed object and a video calibration target, integral with the fixed object and having a known position,
   the video conference control system further comprising an automatic pattern recognition system for comparing said video image with a template image in which the video calibration target is shown at a location and size corresponding to a desired orientation of the video camera,
   the video conference control system programmed for transmitting commands to adjust the variable viewing orientation of the video camera based on the comparison of the video image with the template image until the video image matches the template image,
   whereby the viewing orientation of the video camera can be adjusted by aligning the position of the video calibration target in a video image produced by the video camera.

2. A video camera calibration system in accordance with claim 1, further comprising a remotely controllable pan-tilt-roll mechanism, associated with the video camera, whereby the viewing orientation of the camera can be remotely adjusted.

3. A video camera calibration system in accordance with claim 1, further comprising a video processor, configured to analyze a video image including the fixed object, and to orient the video camera to place the video calibration target in a selected location in the video image.

4. A video camera calibration system in accordance with claim 1, wherein the viewing orientation of the camera is selectively adjustable between a plurality of preprogrammed viewing orientations.

5. A video camera calibration system in accordance with claim 1, wherein the video calibration target defines at least two fixed points within the video image.

6. A video camera calibration system in accordance with claim 1, wherein the video calibration target has a high contrast with surrounding materials, and has a minimum dimension of at least 2 pixels in an image thereof at any orientation of the video camera.

7. A video camera calibration system in accordance with claim 1, wherein the video calibration target is selected from the group consisting of an elongate strip of trim, a logo and a portion of a fixture.

8. A video camera calibration system in accordance with claim 1, wherein the fixed object comprises a conference table, and the video calibration target comprises a line of contrasting trim associated with a surface of the table.

9. A video camera calibration system in accordance with claim 8, wherein the line of contrasting trim has a length selected to occupy substantially an entire width of the video image with the camera oriented with a selected field of view.

10. A method for configuring a video conference environment, comprising the steps of:
    a) orienting a video camera to face a fixed object in a video conference environment;
    b) obtaining a video image of the fixed object and of at least a portion of a video calibration target, integral with the fixed object and having a known position; and
    c) analyzing the video image to determine an orientation of the video camera.

11. A method in accordance with claim 10, wherein the step of analyzing the video image comprises graphically analyzing the video image via a pattern recognition algorithm, to determine the graphical location of the calibration target within the video image.

12. A method in accordance with claim 10, further comprising the step of reorienting the video camera to place the graphical image of the video calibration target at a selected size in a selected location in the video image.

13. A method in accordance with claim 10, wherein the step of analyzing the video image comprises a remote user viewing the video image to determine the graphical location of the calibration target, and remotely reorienting the video camera to place the graphical image of the video calibration target at a selected size in a selected location in the video image.

14. A method in accordance with claim 10, wherein the step of orienting the video camera to face a fixed object comprises orienting the video camera to face a video conference table having video calibration target in a surface of the table.

15. A method for calibrating a video camera system, comprising the steps of:

obtaining, from a video camera, a video image of a fixed object and of at least a portion of a video calibration target, integral with the fixed object and having a known position;

analyzing the video image to determine an orientation of the video camera by comparing the video image to a template image in which the video calibration target is shown at a location and size corresponding to a desired orientation of the video camera; and transmitting commands to adjust the orientation of the video camera based on the comparison of the video image with the template image until the video image matches the template image.

16. A method in accordance with claim 15, wherein the step of analyzing the video image comprises graphically analyzing the video image via a pattern recognition algorithm, to determine the graphical location of the calibration target within the video image.

17. A method in accordance with claim 16, wherein the step of graphically analyzing the video image via a pattern recognition algorithm comprises:

graphically identifying a target location within the video image;

calculating a required camera adjustment to bring the target location to a desired location; and adjusting the camera orientation to move the target image location to a new location coincident with the desired location.

18. A method in accordance with claim 16, further comprising:

analyzing a coincidence of the new location with the desired location; and repeating steps (d) through (f) until the new location is substantially coincident with the desired location.

19. A method in accordance with claim 15, further comprising the step of reorienting the video camera to place the graphical image of the video calibration target at a selected size in a selected location in the video image, the step of reorienting the video camera comprising adjusting at least one of the pan, tilt, roll, and zoom of the camera.

20. A method in accordance with claim 15, wherein the step of analyzing the video image comprises a remote user viewing the video image to determine the graphical location of the calibration target, and remotely reorienting the video camera to place the graphical image of the video calibration target at a selected size in a selected location in the video image.

* * * * *